US 11,181,447 B2

(12) United States Patent
Price et al.

(10) Patent No.: US 11,181,447 B2
(45) Date of Patent: Nov. 23, 2021

(54) APPARATUS AND METHOD FOR DETERMINATION OF THE FINE PARTICLE DOSE OF A POWDER INHALATION FORMULATION

(71) Applicant: NANOPHARM LIMITED, Newport (GB)

(72) Inventors: Robert Price, Chepstow (GB); Jagdeep Shur, Bath and North East Somerset (GB)

(73) Assignee: NANOPHARM LIMITED, Newport (GB)

(*) Notice: Subject to any disclaimer, the term of this patent is extended or adjusted under 35 U.S.C. 154(b) by 0 days.

(21) Appl. No.: 16/903,405

(22) Filed: Jun. 17, 2020

(65) Prior Publication Data

US 2020/0319062 A1 Oct. 8, 2020

Related U.S. Application Data

(63) Continuation of application No. 15/761,143, filed as application No. PCT/GB2016/052957 on Sep. 22, 2016, now Pat. No. 10,724,928.

(51) Int. Cl.
*G01N 1/22* (2006.01)
*G01N 15/02* (2006.01)

(52) U.S. Cl.
CPC ......... *G01N 1/2205* (2013.01); *G01N 1/2208* (2013.01); *G01N 15/0272* (2013.01);
(Continued)

(58) Field of Classification Search
CPC ............. G01N 1/2205; G01N 15/0272; G01N 1/2208; G01N 15/0255; G01N 2015/0261; G01N 2001/2223; G01N 1/24
See application file for complete search history.

(56) References Cited

U.S. PATENT DOCUMENTS 3,748,905 A 7/1973 Fletcher et al.
4,046,512 A 9/1977 Kaczmarek et al.
(Continued)

FOREIGN PATENT DOCUMENTS

CN 1334755 A 2/2002
CN 1675534 A 9/2005
(Continued)

OTHER PUBLICATIONS

International Search Report and Written Opinion issued in corresponding International Patent Application No. PCT/GB2016/052957 dated Dec. 14, 2016 (14 pages).
(Continued)

*Primary Examiner* — Benjamin R Schmitt
(74) *Attorney, Agent, or Firm* — Kilyk & Bowersox, P.L.L.C.

(57) ABSTRACT

In an apparatus for collecting aerosolised respirable particles of an inhalable medicinal formulation, aerosolised formulation is drawn pneumatically through a dose collection section comprising an inlet orifice (201) and an air-permeable filter (206), the filter being positioned opposed to said orifice, and extending across the pathway (4) for filtering the pneumatic flow so as to retain particulate material therein on the filter, and the orifice (201) being so dimensioned and configured that it has an unimpeded area that is no less than 75% of the area of the filter (201) on which the dose will be collected. In a method using the apparatus, particles (209, 210) collected on the filter may optionally be subjected to a dissolution test. A good correlation is obtainable between in vitro and in vivo doses with improved independence of loading.

28 Claims, 9 Drawing Sheets

(52) U.S. Cl.
CPC . *G01N 15/0255* (2013.01); *G01N 2001/2223* (2013.01); *G01N 2015/0261* (2013.01)

(56) References Cited

U.S. PATENT DOCUMENTS

| | | | |
|---|---|---|---|
| 4,092,221 A * | 5/1978 | Schlichting, Jr. | G01N 1/10 |
| | | | 435/288.2 |
| 4,204,550 A | 5/1980 | Newman et al. | |
| 4,350,507 A | 9/1982 | Greenough et al. | |
| 4,461,183 A | 7/1984 | Wedding | |
| 4,902,318 A * | 2/1990 | Stevens | G01N 1/2208 |
| | | | 55/320 |
| 4,972,957 A | 11/1990 | Liu et al. | |
| 5,317,930 A | 6/1994 | Wedding | |
| 5,702,506 A * | 12/1997 | Shih | B01D 46/12 |
| | | | 55/343 |
| 6,379,412 B1 | 4/2002 | Porterfield | |
| 6,513,345 B1 | 2/2003 | Betting et al. | |
| 2003/0015098 A1 | 1/2003 | Robertson et al. | |
| 2004/0002166 A1 | 1/2004 | Wiederin | |
| 2004/0069714 A1 | 4/2004 | Ferguson | |
| 2008/0196514 A1 | 8/2008 | Kenny | |
| 2009/0139352 A1 | 6/2009 | Shelton et al. | |
| 2014/0347663 A1 * | 11/2014 | Rodes | G01N 33/0016 |
| | | | 356/338 |
| 2018/0275022 A1 | 9/2018 | Price et al. | |

FOREIGN PATENT DOCUMENTS

| | | | |
|---|---|---|---|
| CN | 1720441 A | | 1/2006 |
| CN | 202420926 U | | 9/2012 |
| CN | 103257060 A | | 8/2013 |
| CN | 103674624 A | | 3/2014 |
| EP | 2589441 A1 | | 5/2013 |
| SU | 503159 A1 | | 2/1976 |
| WO | 8602160 A1 | | 4/1986 |

OTHER PUBLICATIONS

Copley Scientific, "Quality Solutions for Inhaler Testing," retrieved from Internet: http://www.copleyscientific.com/files/ww/brochures/Inhaler%20Testing%20Brochure%202015_Rev4_Low%20Res.pdf, 2015 Edition, pp. 1-132.
Search Report issued in corresponding United Kingdom Patent Application No. GB1516802.4 dated Jul. 20, 2016 (4 pages).
Search Report issued in corresponding United Kingdom Patent Application No. GB1616163.0 dated Jun. 29, 2017 (4 pages).
Office Action issued in corresponding Chinese Patent Application No. 201680055143.X dated May 19, 2020 (11 pages).
Office Action issued in corresponding Great Britain Patent Application No. 1616163.0 dated Jul. 27, 2020 (5 pages).
May et al, "Dissolution Testing of Powders for Inhalation: Influence of Particle Deposition and Modeling of Dissolution Profiles," Pharm Res, 2014, vol. 31, pp. 3211-3224.
May et al, "Impact of Deposition and the Presence of Surfactants on in vitro Dissolution of Inhalation Powders," Research & Development PharmBio Tec GmbH, Boehringer Ingelheim (1 page).
Search and Examination Report issued in corresponding United Kingdom Patent Application No. GB2019158.1 dated Jan. 15, 2021 (7 pages).
Office Action issued in corresponding Chinese Patent Application No. 201680055143.X dated Mar. 1, 2021 (with English translation)(15 pages).

* cited by examiner

APPARATUS AND METHOD FOR DETERMINATION OF THE FINE PARTICLE DOSE OF A POWDER INHALATION FORMULATION

This application is a continuation of U.S. patent application Ser. No. 15/761,143, filed Mar. 19, 2018, which is a National Stage Application of PCT/GB2016/052957, filed Sep. 22, 2016, which in turn claims priority to United Kingdom Patent Application No. 1516802.4, filed Sep. 22, 2015.

FIELD OF THE INVENTION

The invention concerns apparatuses and methods for collection of particles of an inhalable formulation. The invention also concerns methods for investigating the dissolution characteristics of inhalable medicinal formulations, for example for the purpose of estimating lung deposition and dissolution behaviour of the active ingredient in vivo.

BACKGROUND OF THE INVENTION

Orally inhalable formulations are widely used for the administration of medications via the pulmonary route. Such medications are generally administered for treatment or prophylaxis of pulmonary conditions, the commonest of which include, for example, asthma and chronic obstructive pulmonary disorder. Also, drugs for systemic use may in appropriate circumstances be administered by inhalation.

The efficacy and systemic exposure (lung bioavailability) of an inhaled drug depends on the site of deposition and the physicochemical properties of the drug formulation. Drug particles that deposit in the peripheral non-ciliated regions of the respiratory tract must dissolve before metabolism or transport across the lung membrane can occur. Dissolution is therefore a prerequisite for cellular uptake and/or absorption via the lungs. Simulations suggest dissolution rate is the main driver for drug retention in the lung. At present, however, there is no pharmacopeial method which exists to determine the in vitro dissolution rate of aerosols generated by inhaled products.

Dissolution testing is an important tool in the determination of the bioavailability of many drugs. Standardized dissolution test methods are available for solid dosage forms such as tablets and capsules. Such methods are widely used in quality control and to determine correlations with in vivo release profiles. They are a particularly important tool where there is a necessity to demonstrate the equivalence of different formulations, for example in demonstrating the equivalence of generic drugs to an approved formulation. To date, however, there is no universally accepted method for estimating the dissolution behaviour of inhaled active ingredient dosage forms. This presents an obstacle to the development of reliably bioequivalent formulations. The absence of a pharmacopeial method in particular presents an obstacle to reliably and reproducibly demonstrating bioequivalence of new inhalable generic drugs with pre-existing registered products, and thus renders the obtaining of authorisation for inhalable drugs more difficult than in the case of most oral or injectable drug formulations.

Studies have indicated good correlation between in vivo based measurements of total lung deposition and in vitro measurements of lung dose. Thus, there is a need to collect a representative lung dose for dissolution studies (e.g. ex-cast dose, impactor stage mass, dose below a defined impactor stage etc.). For all reported filter collection systems, there is a slower dissolution rate with increasing collected mass of a given formulation by varying the number of actuations. This effect is thought to be due to formation of in-situ agglomerates created on the filter upon dose collection which in view of the smaller area/volume ratio reduces the exposure of the drug to the dissolution media during dissolution. Since the dissolution characteristics ought to be independent of the method of collection and the number of actuations, the absence of consistency in the dissolution rates is thought to be attributable to an artefact of the collection process. The significant variation observed in dissolution behaviour limits sensitivity and creates challenges when comparing formulations with differing fine particle mass of the same product.

In any dissolution method, two key steps are the collection of the inhalable dose to be dissolved and the dissolution step of dissolving the collected dose. In order to provide a reliable prediction of the dose that will be dissolved in vivo, the sample used in the dissolution step should reflect the dose that, in practice, would be inhaled. In some known collection methods, the inhalable dose is collected on a filter in an inertial impactor.

A reliable method for estimating the dissolution behaviour of inhaled products would have a number of applications. It could be applied in the context of quality control as a tool for evaluating material properties, and processing effects on active ingredient dissolution. It would be of general application in collection and dissolution studies of the aerosolised dose (e.g. determining ex cast, Impactor stage mass etc.). The most important potential application would be to provide an in vitro-in vivo correlation (IVIVC) technique. An IVIVC technique would have the potential to permit reliable evaluation of dissolution behaviour of generic version of pulmonary drugs such as those evaluated on the basis of showing comparability with existing authorised products, thus reducing a current obstacle to the satisfactory evaluation of, for example, generic versions of inhalable drugs.

For a QC testing tool, dissolution models should focus on discriminatory capability, ruggedness and stability.

For use in the above applications, it is critical to develop a dissolution method which can be validated and have the ability to assess drug product quality attributes.

SUMMARY OF THE INVENTION

The invention provides an apparatus for collecting aerosolised respirable particles of an inhalable medicinal formulation, comprising:
  an inlet for receiving an aerosolised dose of the medicinal formulation;
  a suction source for generating a pneumatic flow through the apparatus;
  a channel defining a pathway extending from said inlet to said suction source;
  a dose collection section located in said pathway and comprising an orifice and an air-permeable filter, the filter being positioned opposed to said orifice and extending across the pathway for filtering the pneumatic flow so as to retain particulate material therein on said filter, and the orifice being so dimensioned and configured that it has an unimpeded area that is no less than 75% of the area of said filter on which the dose will be collected
  wherein said suction source communicates with said pathway downstream of said filter unit.

In conventional impactors, powders are separated using inertial effects, with the particles being separable according to their particle size by virtue of the variation of inertial behaviour with particle size. Inertial separation techniques are advantageous in that they permit the physical separation according to particle size, thereby enabling the location of the deposition of the API as between particle size fractions to be determined. That can be important since the effectiveness and distribution of deposition of the API within the lung will be a function of their aerodynamic particle size. Impactors have a series of stages each made up of a plate, with multiple nozzles. Air carrying the aerosolised powder is drawn into the impactor, and flows sequentially through the stages. The number of nozzles increase while the size and total nozzle area decrease with the stage number.

As particles accelerate through the nozzles they either remain entrained in the air stream, which is deflected at the exit of the nozzle, or inertia causes them to be separated from the deflected flow, impacting on the collection surface. As direction of flow changes, aerosol particles continue to move in the original direction until they lose inertia. They then "relax" into the new flow direction (Relaxation time). Placing a collection surface normal to the original flow causes the particles which have insufficient relaxation time to impact. Small particles relax more quickly, thus do not impact. By controlling the number of jets, their diameters (W) and the impaction stage separation (S) the effective cut-off aerodynamic diameter can be controlled at various flow rates. Thus, particles with a given level of inertia are collected, whilst the rest of the sample passes onto the next stage. Each stage of the impactor is therefore associated with a cut-off diameter, a figure defining the size of particles that are retained on the collection surface of that stage of the impactor device.

The main features of an impactor stage are a nozzle plate(s) through which the flow and entrained particles are delivered, an impaction plate and a stage wall. The design and engineering of the nozzle plate is most critical to the collection parameters, the number (N) of nozzles or jets and their diameter (W) being the major design parameters. Varying N and W allows the Reynolds number (Re) of the air flow to be controlled between set limits (generally 500<Re<3000). The relationship between the Reynolds number and the impactor geometry in an impactor type device is well understood by those skilled in the art (see for example Marple et al, Atmospheric Environment, 10, pages 891-896, 1976).

Except for stage 1 of the conventional impactors, in which a crude separation of large, non-respirable particles is accomplished, the nozzles of the known impactors are dimensioned and configured to generate a pressure difference which results in acceleration of the air flow as between a point immediately upstream of the nozzle and the region immediately downstream of the nozzle. This acceleration is important in generating the inertia required for the separation process at the subsequent deflection point. For example at stage 2 of a conventional impactor operating at an air flow of 60 L/min, the air flow through the nozzles may be typically accelerated to emerge as a multiplicity of air jets of air flow velocity of about 890 cm/s. In contrast, in accordance with the invention a larger orifice provides an unimpeded pathway for delivery of the air flow onto the filter. As a consequence, the air flow in the filter unit (dose collection section) in the apparatus of the invention has a lower velocity, for example of not more than 250 cm/s, preferably not more than 200 cm/s, especially not more than 150 cm/s. The air velocity is preferably at least 30 cm/s, for example at least 50 cm/s. In one advantageous embodiment the air flow velocity is from 60 to 100 cm/s. It is thought that the combination of lower flow velocity and greater uniformity of flow across the pathway enables more even deposition to take place, in contrast to the discrete high velocity air jets that are present on leaving the nozzles in a typical impactor stage.

In contrast to the known impactors, the apparatus of the present invention has a dose collection section having an orifice, opposed to and upstream of the filter, which has an unimpeded area that is no less than 75% the area of the filter that is to be deposited on. The filter of the collection device is opposed to the orifice and extends across the pathway. In that manner, the aerosolised particles, carried by the fluid flow, can be delivered onto the filter along a direction that is essentially perpendicular to the surface of the filter on which the particles impact.

The invention also provides a method for collecting an aerosolised respirable fraction of a medicinal formulation including respirable and non-respirable particle size fractions, comprising:

generating an aerosolised dose of the medicinal formulation containing respirable and non-respirable particles;
removing particles of a non-respirable size from said aerosolised dose by inertial separation;
delivering a pneumatic flow carrying respirable particles along an unimpeded pathway to a filter;
effecting filtration of the pneumatic flow at said filter such that the particles are retained on the filter.

The inventors have found that, surprisingly, the collection of particles in the apparatus and method of the invention enables particles of medicinal formulations to be collected in a particularly even deposit. That enables greater reliability and reproducibility in determining the dissolution characteristics of the deposited material, which are less susceptible to variation in accordance with the amount of material deposited on the filter.

Accordingly, in another aspect, the invention provides a method for determining the dissolution characteristics of a an inhalable medicinal formulation comprising: generating an aerosolised dose of the medicinal formulation containing respirable and non-respirable particles; removing non-respirable particles from said aerosolised dose by inertial separation; delivering a pneumatic flow carrying the respirable particles along an unimpeded pathway to a filter; effecting filtration of the pneumatic flow at said filter such that the particles are retained on the filter; and subjecting the filter carrying said collected particles to a dissolution test. The unimpeded pathway preferably extends from a delivery orifice opposed to the filter, the area of cross-section of the pathway that is unimpeded being at least 75% of the area on which the dose is to be deposited on the filter.

Definitions

"Inhalable medicinal formulation" is to be understood as referring to a formulation which is suitable for administration to a human or animal patient, preferably a human patient, by inhalation comprising one or more active ingredients that is effective in the treatment, prophylaxis or diagnosis of a disease or condition of a human or animal, especially a human, that is capable of pulmonary administration by inhalation. Inhalable formulations of the invention include, without limitation, powders for use in dry powder inhalers, formulations for use in metered dose inhalers, and solutions or suspensions for use in nebulizer devices.

"Powder formulations" as used herein refers to formulations which include particulate solids and, in the context of this specification, are preferably dry powder formulations for use in a dry powder inhaler device or formulations for use in metered dose inhalers.

Active ingredient" in this specification is to be understood as including ingredients which are effective through any therapeutic route. For the avoidance of doubt active ingredients for the purpose of this application include therapeutically effective drugs that can be administered via the pulmonary route for local treatment, prophylaxis or diagnostic methods to be practised on the lung, therapeutically effective drugs that can be administered via the pulmonary route for systemic treatment, prophylaxis or diagnostic methods to be practised on one or more other parts of the body of the patient, and active ingredients that can be administered via the pulmonary route for local treatment, prophylaxis or diagnostic methods to be practised on the lung by mechanical or physical routes, as in the case of lung surfactant. Active ingredients administered by the pulmonary route for local effect include, for example, drugs for use in the treatment of asthma, COPD, allergic rhinitis, cystic fibrosis, and tuberculosis. Systemic drugs administrable via the pulmonary route include for example insulin and small peptide therapeutics.

"Emitted dose" as used herein refers to the theoretical dose of an active ingredient that is expelled when an inhalation device is actuated. It may be equal to the theoretical total amount of the drug that is aerosolised, but may be less if the theoretical dose is not all successfully aerosolised.

"Particle" is used herein generally refers to solid particles unless the context implies otherwise.

"Respirable fraction" is used herein to refer to the fraction in % of particles that theoretically reaches the lungs of a typical patient on inhalation of a dose of a powder formulation. That fraction is generally understood by those in the art to be the sub fraction of the aerosolised particles of a powder formulation that have an aerodynamic diameter of less than 10 μm.

"Respirable dose" is used herein to refer to the amount of the emitted dose of a drug that theoretically reaches the lungs of a typical patient on inhalation of a dose of an inhalable medicinal formulation. The respirable dose may be estimated with a reasonable degree of accuracy as corresponding to the dose collected at or after Stage 2 in a conventional impactor (for example a Next Generation Impactor of MSP), also commonly referred to as the impactor stage mass ("ISM").

"Fine particle dose" as used in this specification refers to the dose of aerosolised drug particles with an aerodynamic diameter of less than 5 μm. To determine the Fine Particle Dose from an impactor requires either interpolation or regression based analysis of impactor data to determine the dose associated with an aerodynamic cut-off of 5 μm diameter particles.

"Aerodynamic diameter" is defined as the diameter of a sphere of density 1000 kg/m³ with the same settling velocity as the particle of interest. Aerodynamic diameters may be ascertained by any of the methods customarily used by those in the art. Aerodynamic diameter values specified herein are as determined using a cascade impactor.

Flow rates or velocities referred to herein are measurable using any suitable flow meter, for example a Copley DFM 2000 Flow Meter (Copley Scientific) which can be used for determining standard or volumetric flow rates.

"Unimpeded area" is used herein with reference to a pathway or an orifice as meaning that the pathway or orifice does not contain within the area any structure that would interrupt a pneumatic flow through that area of the pathway or orifice, and reference to a pathway or orifice with a given percentage unimpeded area is to be understood as being the percentage of the area of the orifice or area of cross section of pathway that is free from any structure that would, if provided within a region of the area of an orifice or pathway would interrupt a pneumatic flow through that region of the orifice or pathway.

DETAILED DESCRIPTION

In accordance with the present invention an aerosolised dose of medicinal formulation is generated at an inlet to the apparatus of the invention, and a suction device draws a pneumatic flow through the apparatus from a downstream access point. A dose collection section is provided in the pathway of the pneumatic flow through the apparatus. The aerosolised formulation is caused to flow along a pathway, which may in some embodiments be a convoluted pathway containing at least one separation point. Where there is one or more separation points, at each separation point the air flow, carrying aerosol, is deflected, such that a particle fraction in excess of a selected particle size is expelled from the air flow through the effects of inertia. In that manner, if desired, two or more separation points provided in series can be used to separate progressively smaller particle size fractions.

The invention is of particularly advantageous application in relation to formulations for dry powder inhalers and metered dose inhalers.

In one advantageous application of the apparatus and method of the invention, the respirable fraction of the aerosolised inhalable medicinal formulation is collectable in the dose collection section. That enables an accurate prediction to be made of the amount of the active ingredient of the formulation that is actually delivered into the lung of a typical patient.

In the apparatus of the invention the orifice is so dimensioned and configured that it has an unimpeded area that is no less than 75% of the area of said filter on which the dose will be collected. In contrast, in a standard impactor device, a major part of the pathway is obstructed by a nozzle device having multiple nozzle jets, with the jets forming only a minority of the cross section of the nozzle device, with the result that the pneumatic flow passing through the jets is accelerated and leaves the jets in the form of multiple parallel jets at relatively high flow rates. In the apparatus of the invention, the pneumatic flow is delivered through an orifice of which only a minor proportion—no more than 25% of the area of the orifice—is impeded, which enables the pneumatic flow to be delivered to the filter along a pathway which is unimpeded or is no more than 25% impeded by structures that will interrupt the flow. Thus, in contrast to the known impactors, the device of the invention has a dose collection section in which the aerosol is delivered in a relatively uniform and relatively slow-moving flow, the entire flow being directed onto a collection filter. This flow pattern is in contrast to the nozzles (also referred to as "jets") that accelerate the pneumatic flow in known impactors for the purpose of achieving inertial separation. In some embodiments there may be present in the pathway upstream of the orifice of the dose collection section a first removal device for removal of particles of particle size of 10 μm or greater and optionally one or more further removal devices for removal of one or more additional particle size fractions. A removal device for removal of particles of a given particle size may, for example, be a stage or stages of an impactor, especially an inertial separating stage arranged to separate particles in excess of a certain aerodynamic diameter. Where more than one further removal devices are present, those may include two or more impactor stages arranged in series arranged for inertial separation of successively smaller size particle fractions. Thus, for avoidance of doubt, the apparatus of the invention may additionally include such multiple nozzle structures in parts of the pathway upstream of the collection device, for example in one or more inertial removal devices optionally present for removal of one or more particle size fractions from the aerosolized formulation prior to reaching the dose collection section. The removal of particle size fractions that may normally be considered to be within the respirable fraction may be useful, for example, when attempting to replicate the respirable fraction of patients with respiratory function that is lower than that of the average adult patient, for example in the case of children, neonates, or adults with impaired respiratory function.

The dose collection section may in one embodiment comprise a filter unit located downstream of the orifice, wherein the filter unit comprises said filter. The filter unit may, for example, be incorporated into the structure defining the pathway. In other embodiments, the portion of the pathway extending between the inlet orifice and the filter may be provided at least in part by a channel member inserted between the orifice and the filter.

The necessary flow characteristics to achieve uniform deposition on the filter are achievable in accordance with the invention by appropriate selection of the orifice area. Since in practice the orifice area will generally be circular, the discussion hereafter is given with reference to a circular orifice. It is to be understood, however, that the orifice is not necessarily circular in configuration and may be of any suitable configuration, for example, oval, square, or rectangular, the configuration of the filter preferably being selected to be similar or the same as that of the orifice. In practice, the orifice diameter is selected to be greater than the diameters of nozzles conventionally used in nozzle plates of impactor devices. For example, the diameter of the orifice may advantageously be at least 10 mm in diameter, advantageously at least 15 mm in diameter, especially at least 20 mm in diameter. In practice, it will generally be preferred that the diameter of the orifice is not more than 50 mm, for example not more than 45 mm, especially not more than 40 mm. In practice, it has been found expedient for the orifice to be provided by a tapered member, the taper being such that there is defined at the outlet an orifice diameter value as specified above. The use of a tapered member has been found to reduce turbulence effects.

It is an important feature of the invention that the orifice has an unimpeded area that is no less than 75% of the area of the filter on which the dose is to be deposited. The orifice may, if desired be divided into two or more regions, effectively forming two or more discrete apertures for emission of the air flow, provided that the area of the orifice that is unimpeded, for example is not obstructed by dividing means, is at least 75% of the area of deposit on the filter. In some embodiments, the orifice has an outlet area which is no less than 80%, for example, no less than 90% of the area of the filter on which deposition takes place. In practice, the orifice area will generally not be greater than the area of the filter on which deposition takes place.

In one embodiment of the invention, when the apparatus is operating at an overall flow rate of 60 L/min and the orifice has a diameter of 39 mm, the velocity of the air is about 83 cm/s.

The unimpeded area of the orifice through which the air flow is delivered onto the filter is not less than 75% of the area of the filter on which deposition takes place. The diameter of the filter is advantageously at least 10 mm, preferably at least 15 mm, for example at least 20 mm. Advantageously, the filter has a diameter not exceeding about 60 mm, more advantageously not exceeding about 50 mm, for example not exceeding about 45 mm. It will be appreciated that it will be possible in principle to use a filter of larger dimensions. In that case, it is to be understood that, for the purpose of determining the relative sizes of the orifice and the filter, the area of the filter for that purpose is that area in which at least 90% by weight of the collected material is deposited.

The Reynolds number is the ratio of the inertial forces to viscous forces and can predict the type of flow which will occur in a particular situation. In the design of the nozzles in an impactor, varying the number of nozzles and the width of the jets enables the air flow to be controlled between set limits to maintain laminar flow. Typically, the number of jets is chosen to control the Reynolds number. To maintain laminar flow over a range of flow rates the limit of Re (Reynolds number) should ideally be between 500 and 3000. Whilst, in contrast to a multi-stage impactor device the apparatus of the invention seeks to collect essentially the entire load of a flow passing through an orifice, it has been found nonetheless that more even collection of particles is generally obtained where the orifice diameter is such the that at some or all of the flow rates typically to be used the Reynolds number will be in the range of 500 to 3000, that is, the flow is laminar or near-laminar. In practice, it has been found that a round orifice of diameter 2 to 5 cm, preferably 2.5 to 5 cm, more preferably 3 to 5 cm, for example 3 to 4.5 cm is suitable. Such dimensions have in particular been found to be advantageous where, in use, flow rates of 10 to 100 L/min, for example, 15 to 100 L/min, especially 15 to 70 L/min are used, for example flow rates of 30 L/min or 60 L/min. Advantageously the pathway comprises a tapered portion leading to the orifice, In one embodiment the nozzle diameter has an internal diameter of 4.5 cm at the top of the nozzle section and reduces to 3.9 cm at the opening. The reducing diameter is advantageous in that it reduces the presence of sharp angles which may induce turbulence.

It is preferred that the filter, or at least that part of the filter on which deposition occurs, is of substantially planar configuration.

In certain preferred embodiments, for example where it is desired to collect the respirable fraction of particles in an aerosolised dose, a removal device is provided in the pathway upstream of the dose collection section. Removal devices may be of any suitable type. Where present, a removal device may be suitable for removing from the pneumatic flow particles of particle size of 10 µm or greater at a location between said inlet and said orifice. Thus, in preferred embodiments, the apparatus allows collecting of the whole dose onto the filter after removing the non-respirable fraction. In that way, the removal device may mimic the anatomical throat thereby making the apparatus in principle suitable for a pharmacopeial method for determining the respirable dose of an inhalable formulation.

A removal device located in said pathway upstream of the dose collection section, is thus advantageously suitable for removal of particles of non-respirable particle size from the pathway, with the dose collection section being arranged to collect the respirable dose of the medicinal formulation. Suitable as removal device is in particular an inertial removal device. An inertial removal device used in the invention may optionally comprise a deflection region in said pathway, whereby particles having less than a predetermined aerodynamic diameter are deflected with the pneumatic flow in said deflection region and particles having an aerodynamic diameter greater than said predetermined aerodynamic diameter are flung out of the pathway by inertial effects. For example, there are commercially available devices known as "anatomical throats" which are suitable for removing larger particles. Such devices have been demonstrated to filter an inhalation dose such that the does passing the throat correlates well with the dose found to have entered the lung in in vivo lung deposition studies. In some embodiments, there is provided in said pathway between said removal device and said dose collection unit one or more inertial separation units for elimination of one or more further particle size fractions from the pneumatic flow before it reaches said dose collection unit.

The apparatus of the invention includes a dose collection section, which as mentioned above includes a filter. The filter is arranged orthogonally with respect to the direction of flow of the pneumatic flow downstream of the orifice. As already mentioned, it is desired that, at the point of impact with the filter, the conditions are of relatively uniform and low-velocity pneumatic flow. In practice, that may be achievable by appropriate selection of the dimensions of the orifice and appropriate selection of the spacing between the orifice and the filter. It is preferred that the orifice has a diameter of not less than 14 mm. The distance between the orifice and the filter is advantageously not more than three times the diameter of the orifice, for example up to twice the diameter of the orifice. Where the distance between the orifice and the filter is large, interference as a result of deposit of material on the wall may adversely affect collection efficiency, and in practice it may be desirable for the separation distance to be considerably shorter than three times the diameter of the orifice. By way of illustration in some embodiments the distance between the orifice and the filter may be up to 10 cm, for example from 1 to 10 cm. It is preferred that the portion of the pathway extending from the orifice to the filter is straight and is uninterrupted or substantially uninterrupted by any structures that would materially interfere with the uniformity of the flow.

Advantageously, the filter obstructs at least a portion of the pathway at a point downstream of the orifice. In some embodiments, the filter obstructs substantially the entire pathway.

Advantageously, the dose collection section comprises a filter and a filter support, wherein the filter is supported by a peripheral frame.

In certain embodiments, the filter unit has a filter and a filter support comprising one or more elongate support members extending across the pathway on the surface of the filter opposed to the orifice for supporting a central region of the filter, the filter support defining from two to six apertures and obstructing no more than 80%, preferably not more than 90%, of the surface area of said opposed surface. For example, the support may have three elongate support members, which may optionally be arranged as a three-legged cross. It has been found, surprisingly, that providing a substantial area of support structure under the filter influences undesirably the pattern of deposition of solids on the filter. It is believed that, whilst the passing of the air through the filter inevitably disrupts to some extent the uniformity of flow, the provision of support structures under the filter significantly influences the flow in such a way that it is disrupted upstream of the filter so as to form preferential islands of agglomerated deposition at points where the carrier air is free to pass through the filter. For that reason, it is preferred that as much as possible of the underside of the filter, for example at least 50% or at least 80%. remains completely unobstructed thereby avoiding any undue effect on the uniformity of the flow as it passes through the filter. Thus it is also possible that the filter has essentially no support structure other than at the perimeter, where further support is unnecessary, thereby leaving the opposed surface essentially completely unobstructed.

It is a particular advantage of the apparatus of the invention that the aerosolised particles are captured across the entire surface of the filter rather than being deposited in well-defined locations in relation to the position of delivery jets (as in certain known apparatus) or in relation to support structures obscuring the pathway under the filter.

As filter there may be used any filter that is appropriate for retaining particles in the range of up to 5 µm, for example in the range of from 0.5 µm to 5 µm For example, there may be used filters with pore size of up to 3 µm. Advantageously, the filter has an air permeability which is such that the filter generates a reduction in flow rate of not more than 20%, preferably not more than 15%, more preferably not more than 10% as compared with the flow rate in absence of a filter. Such filters may, but do not necessarily, have a pore size of at least 1 µm.

The filter may, for example, be selected from woven fabrics, nonwoven fabrics, meshes and air-permeable films. In some embodiments, the filter comprises a fabric formed from glass microfibers or from filaments of a polymeric material selected from polycarbonates, polyesters, polyolefins, polyamides (for example nylons), acrylics, acrylic copolymers, polyvinylchlorides and polyetheretherketones. Suitable polyolefins include, for example, polyethylene, polypropylene and ethylene and propylene copolymers with one or more other monomers.

Suitable glass microfibers include, for example, borosilicate glass, such as the glass fiber filters commercially available from Pall Corporation, USA as Type A/E, with a nominal pore size of Illustrative of suitable polymer filters include acrylic co-polymer filters with a pore size 3 µm or less, for example those with pore sizes of 0.2, 0.45, 0.8, 1.2 and 3 µm. Polymer filters of polyamide or of polyvinylchloride with a nominal pore size of 3 µm or less are also widely commercially available.

In other embodiments, the filter comprises a metal mesh, for example, of stainless steel, which advantageously has a pore size of less than 3 µm. Other suitable materials include, for example, polymer films provided that they have a suitable level of air permeability.

In one preferred embodiment, the apparatus comprises a removal device for removal of particles of non-respirable particle size and the arrangement is such that all particles remaining in the pneumatic air flow after removal of non-respirable particles are delivered to the dose collection unit. Advantageously, the arrangement is such that at least 95% by mass of particles having an aerodynamic diameter of 10 µm or less will reach the filter unit. In that respect, the dose captured is equivalent to that captured in conventional set-ups currently used for collection of the aerosol particles using an inertial impactor or a unit dose collection apparatus (DUSA). However, using the apparatus of the invention a more even deposition is obtainable enabling inter alia the minimisation of undesirable and unpredictable variations in dissolution tests that may be attributable to uneven depositing in previously known apparatuses.

As already mentioned, in certain embodiments the apparatus may comprise one or more additional separation stages in the pathway upstream of the filter device. The number of such additional separation stages may depend on the flow rate to be used for dose collection, which as described elsewhere herein will be dependent on the nature of the formulation to be analysed. Advantageously, there is present at least one separation stage, preferably an inertial separation device, for non-respirable particles. Optionally there is present at least one further separation stage for particles of aerodynamic diameter of 3 µm or more. Particles with aerodynamic diameter less than 2-3 µm may in some circumstances provide better in vitro-in vivo correlation between in vitro dose and clinical parameters (e.g. pharmacokinetics and total lung dose).

Advantageously, the apparatus further comprises upstream of said orifice an inertial separation device having a delivery nozzle that is of cross-sectional area smaller than the cross-sectional area of said orifice. In some embodiments, the upstream inertial separation device is in communication with the orifice via the said pathway. Whilst in some embodiments, such an upstream inertial separation device may be integrated with the channel such that the pneumatic air flow is in effect continuous from said separator to the filter unit, it is also within the scope of the invention for the upstream inertial separation device to be provided in a separate pneumatic flow channel which is not connected in continuity with the air flow through the orifice and filter unit, for example, as in the case where the upstream inertial separation device is provided in the form of a separable device.

The person skilled in the art will be familiar with the application of suction for the purpose of drawing through a pathway an air current and entrained medicinal formulation at an appropriate flow rate. The selection of suction conditions appropriate to the formulation being collected will be a routine matter for those skilled in the art.

In practice it has been found expedient to use lower flow rates for MDI and nebuliser formulations than for dry powder formulations. Generally pMDIs are tested at a fixed flow rate of 30 L/min. Nebuliser formulations are typically tested at a flow rate set to 15 L/min, with the apparatus being chilled to 5° C. to prevent changes in the particle size growth that might otherwise appear in these liquid systems. For dry powder formulations, the flow rate is generally set according to the pressure drop generated across a particular device. The flow is generally set to a pressure drop of 4 kPa. In some circumstances, for example under some national regulatory requirements, DPI testing is carried out at lower or higher flow rates than the flow rate that would be generated at such a pre-set pressure drop.

For example, in practice it has been found expedient by way of illustration to use a flow rate of 30 L/min for MDIs. A lower flow rate of for example 15 L/min may be applicable in the case of nebuliser formulations. The flow rate for collection of dry powder formulations may depend on the inhaler device resistance with formulations delivered by more resistant inhaler devices ideally being tested at relatively low flow rates and formulations delivered by devices of low resistance being tested at relatively high flow rates. In practice, the flow rate used in testing of DPIs may vary, for example may be at least 19.5 L/min, and may be for example up to 100 L/min.

The apparatus and method of the invention may be applied to dose collection of a wide variety of inhalable drugs, and are useful especially for analysis of respiratory formulations. Drugs used in respiratory inhalers include short acting bronchodilators including short acting beta-2 agonists (e.g. salbutamol, terbutaline) and short acting muscarinic antagonists (e.g. ipratropium bromide); long acting bronchodilators including long acting beta-2 agonists (e.g. salmeterol, formoterol, indacaterol, olodaterol, vilanterol) and long acting muscarinic antagonists (e.g. tiotropium bromide, aclidinium bromide, glycopyrronium bromide, umeclidinium); mast cell stabilisers (e.g. nedocromil, sodium cromoglycate); corticosteroids (e.g. budesonide, beclometasone, ciclesonide, fluticasone propionate, mometasone furoate. Combinations of drugs used in respiratory inhalers include, for example, combinations of long acting muscarinic antagonists and long acting beta-2 agonists (e.g. umeclidinium/vilanterol; glycopyrronium/indacaterol; aclidinium/formoterol; olodaterol/tiotropium); and combinations of inhaled corticosteroids and long acting beta-2 agonists (e.g. fluticasone propionate/salmeterol; budesonide.formoterol; fluticasone propionate/vilanterol; beclametasone/formoterol; fluticasone propionate/formoterol.

As is well-known in the art, dry powder inhaler devices deliver a dose of active material which may be pre-metered, for example in blisters, capsules or other cavities, or may be metered in the device itself. The aerosol is generated in use by inspiration of the patient. Carrier particles are generally present to carry the drug particles, and any other excipients. As is known in the art the drug particles are generally adhered to the larger carrier particles at least in part by means of electrostatic forces. Carrier particles in DPIs are often lactose particles. Other suitable sugars or sugar alcohols may be used, for example mannitol.

Illustrative drugs which can be administered effectively from dry power inhaler devices include salbutamol, terbutaline, ipratropium bromide, salmeterol, formoterol, indacaterol, vilanterol, tiotropium bromide aclidinium bromide, glycopyrronium bromide, umeclidinium, corticosteroids, budesonide, beclometasone, fluticasone propionate, mometasone furoate. Combinations of drugs which can be administered effectively from dry powder inhalers include, for example, combinations of umeclidinium/vilanterol; glycopyrronium/indacaterol; aclidinium/formoterol, fluticasone propionate/salmeterol; budesonide.formoterol; fluticasone propionate/vilanterol; beclametasone/formoterol and fluticasone propionate/formoterol. The invention may be used to ascertain the inhalable portion of any of the said drugs or drug combinations, or of any other drug or drug combination that is administrable from a dry powder inhaler.

The invention is also of application to respirable formulations deliverable using a pressurised metered dose inhaler (pMDI). Drugs deliverable from a pMDI include many of the above drugs that are suitable for dispensing from a DPI.

In accordance with one embodiment of the invention, collected particles are subjected to a dissolution test. Dissolution tests are widely practised in the art and the selection of suitable dissolution media and methods for particles collected from a given drug formulation are a routine matter for those skilled in the art. One such test, which may be expediently used, is the paddle dissolution test (US Pharmocopeial Convention 2011, 711, Dissolution, Paddle Apparatus). Illustrative commonly used dissolution media include e.g. phosphate buffered saline (PBS) solution either with or without the addition of a surfactant (e.g. Tween 20, Tween 80, SDS etc.). The solution can be chemically analysed, for example by HPLC, to determine the mass collected.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF DRAWINGS

Certain embodiments of the invention will be described below with reference to the accompanying drawings in which.

Figure 1:
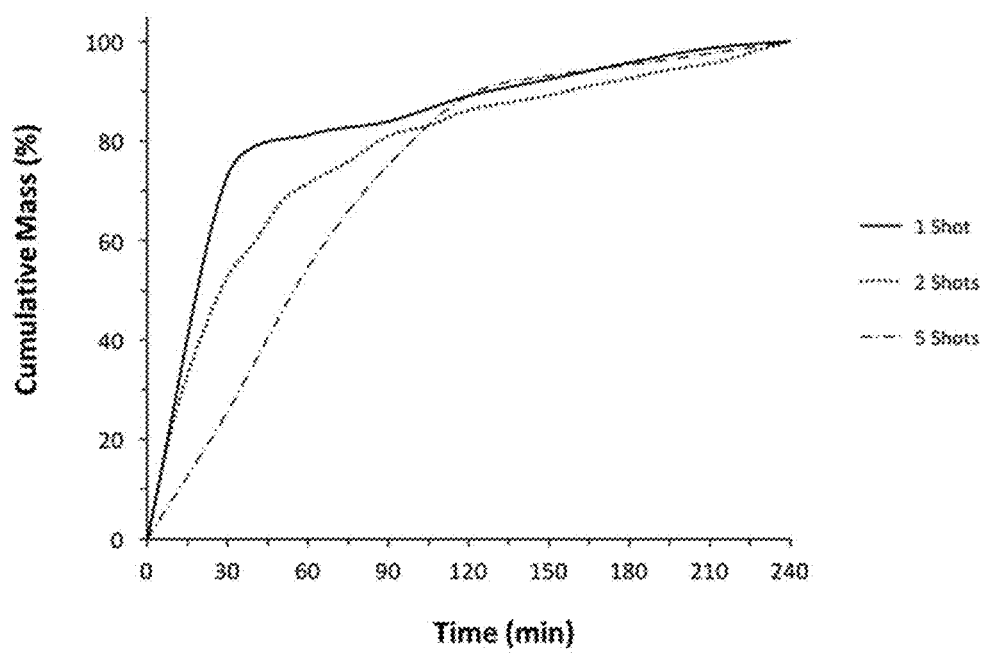
FIG. 1 is a graph illustrating the variation of dissolution rates depending on doses collected using a prior art collection method.

It is a known problem in testing the efficacy of inhaler devices that the determination in the available measurement devices of the dose that will be delivered to the lung (the respirable fraction) is influenced to an undesirable extent by the collection method. That dependency is shown in FIG. 1, which shows the measured dissolution time, using a standard paddle dissolution method, for samples collected by inserting a filter into a standard impactor device under the nozzles. A strong decrease in the rate of dissolution is observed when the particles from multiple actuations of the device are collected. It is believed that the decrease in dissolution rate is caused by uneven deposition of the powder onto the filter, with a larger agglomeration taking longer to dissolve than smaller agglomerations having the same cumulative total mass as a result of the different surface to volume ratios.

Figure 2:
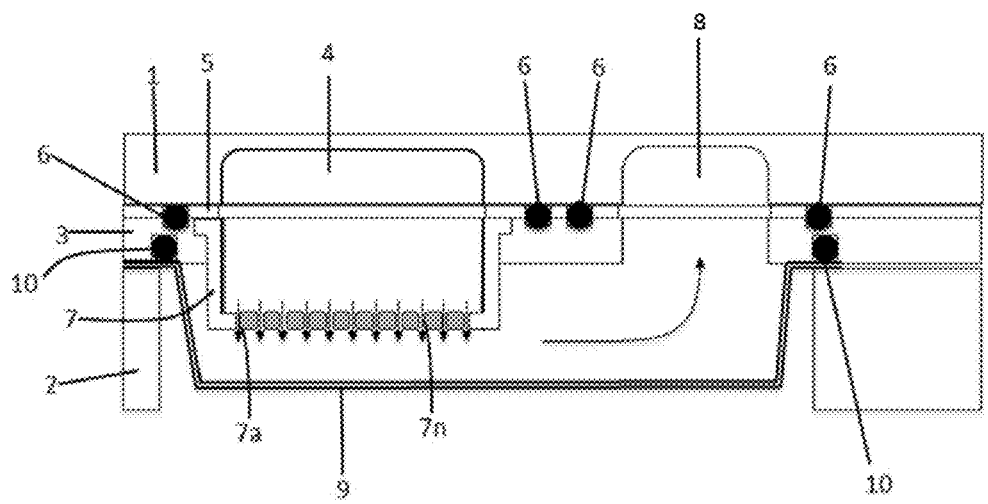
FIG. 2 is a section through an inertial removal device in a conventional impactor device.

With reference to FIG. 2, there is shown a portion of a conventional impactor apparatus. The portion shown is an inertial removal stage arranged to effect the removal of a selected particle fraction from an aerosolised inhalable medicinal formulation travelling through the apparatus as one of a number of removal stages arranged in series for the removal of progressively smaller particle size fractions. A housing is formed principally from an upper member 1 a lower member 2 and an intermediate member 3, which define between them a pathway 4 along which the aerosolized formulation flows, drawn through by a controllable suction source arranged after the final removal stage of the apparatus. The suction source may include a flow controller which may be used in accordance with the routine skill and knowledge of those skilled in the art control the resistance to flow posed by the inhaler, the flow rate, the duration of the inspiration required and the stability of the flow rate. An airtight connection between the member 1 and intermediate member 3 is ensured by a planar member 5 and associated O-rings 6. On reaching the removal stage, the flow is diverted downwards onto multiple nozzles 7a to 7n of a structure 7, the air current being drawn towards and through the nozzles 7a to 7n by the suction source. The diameter of each nozzle is very small and the cumulative area of the nozzles 7a to 7n is also very small compared to the overall diameter of the passageway 4. As a result, the drawing of the air current and entrained particles through the nozzles results in acceleration. Immediately downstream of the nozzles 7a to 7n the pathway is diverted at right angles and, via an exhaust cavity 8 is transported on to the next stage of the apparatus. A collection cup 9 is arranged under the nozzles and is retained in position in airtight fashion between the members 2 and 3 by means of O-rings 10. In practice, as the current of air with entrained particles is accelerated out of the nozzles 7a to 7n and deflected at right angles, smaller particles are deflected together with the air current, whilst larger particles, as a result of inertia, leave the transporting air current and impact on the collection cup 8. The conditions within the apparatus, in particular the suction applied, can be controlled in order to determine the particle size fraction that will be expelled from the flow at each stage of the apparatus. Other removal stages are of similar construction except that upstream stages would have a lower number of slightly larger nozzles than nozzles 7a to 7n whilst downstream stages would have a higher number of narrower nozzles than nozzles 7a to 7n. Those skilled in the art are familiar with the use of such multi-stage impactors and the control of the conditions therein selectively to determine the fractions to be collected.

Figure 3:
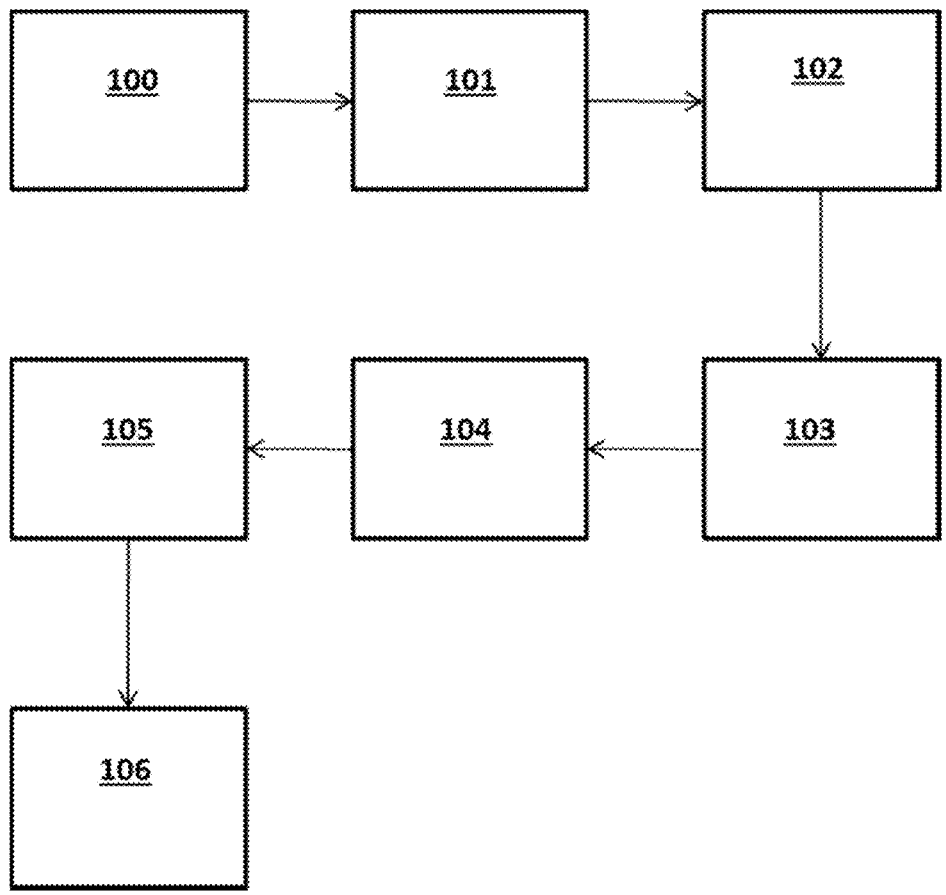
FIG. 3 is a flow diagram showing illustrating an apparatus according to a first illustrative embodiment of the invention

With reference to FIG. 3, the use of an apparatus according to one embodiment of the invention is illustrated in flow diagram form. A dose of an inhalable medicinal formulation is delivered by actuation of the drug delivery device at inlet 100 which expels an aerosolised dose of the formulation into an enclosed pathway within the apparatus. The aerosolized dose is entrained in an air current that is generated through the apparatus by a suction source maintaining desired flow conditions using a flow controller. In the embodiment shown in FIG. 3, the air current carries the aerosolised material through an inertial removal device 101 at which particles of non-respirable size are removed. The inertial removal device is optional. Where present it may be, for example, of the form described with reference to FIG. 2.

The air flow with entrained particles is then conveyed 102 to a dose collection section in the form of dose collection device 103 at which it is expelled through orifice 104 in substantially laminar flow towards a planar filter 105. The orifice 104 will have a cross-sectional area that is not less than 75% of the target area of the filter, that is, the region of the filter in which at least 90% by weight of the particles are deposited. The transport air passes through the filter 105 whilst the entrained particles are retained on the filter. Optionally the process is repeated with a number of sequential actuations of the delivery device. That enables accuracy to be enhanced and any minor variation in the emitted dose on actuation to be smoothed out.

The filter can be removed after the desired number of actuations, and subjected to a dissolution test 106, for example a standard paddle dissolution test, to determine the rate of dissolution after different numbers of actuations, that is, after deposition of different numbers of doses It has been found that, using the method and apparatus of the invention, the reproducibility of the rate of dissolution is improved relative to the previously obtained results, with considerably reduced dependency on the number of actuations of the delivery device.

Figure 4:
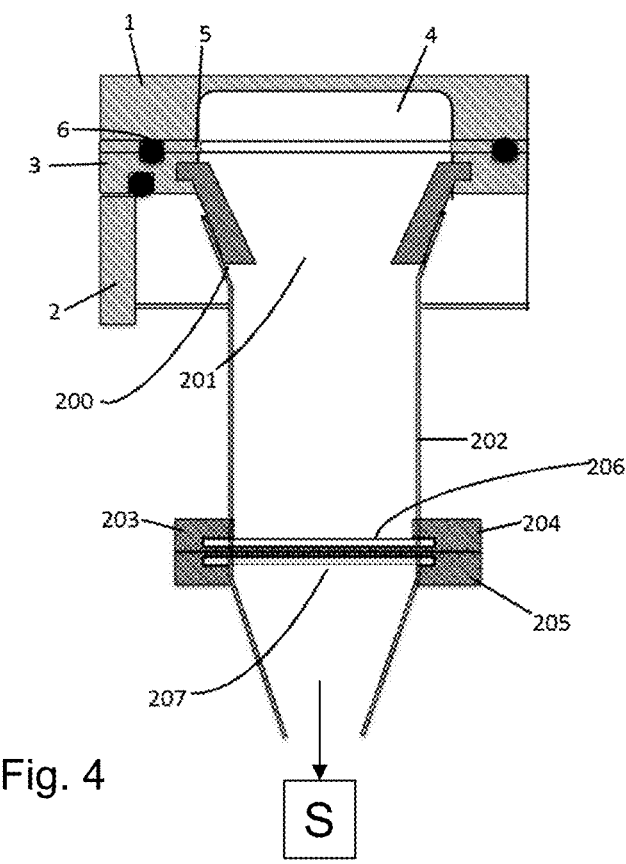
FIG. 4 is a section through a dose collection device within an apparatus according to the invention.

One form of dose collection device for use as dose collection section in the apparatus of the invention is shown in FIG. 4. For convenience the collection device is illustrated with reference to adaptation of a known impactor device. Reference numerals in FIG. 4 that are the same as reference numerals in FIG. 2 refer to corresponding parts. In the collection device of FIG. 4, a funnel 200 is provided instead of the structure 7 and nozzles of FIG. 2. The funnel defines a single inlet orifice 201. The funnel 200 is tapered to reduce the occurrence of sharp edges which may induce turbulence, and is arranged to deliver the fluid flow into an unimpeded vertical pathway extending downwardly from orifice 201 towards a filter collection device. Whilst FIG. 4 shows a single orifice it will be appreciated that it is not essential that the orifice be a single orifice and there may be two or more orifices provided that the area of each orifice and the cumulative total area of all the orifices are sufficiently large to achieve delivery of the air current and entrained particles substantially without the acceleration that is practised in conventional impactor apparatuses.

Immediately beneath the orifice 201 is a cylindrical channel member 202 extending vertically downwards towards a filter unit 203. The filter unit 203 comprises retaining rings 204 and 205 for circumferential retention of a filter 206. The area of orifice 201 is similar to, but slightly less than, the exposed area of filter 206 on which deposit occurs. A suction source schematically indicated by S in FIG. 4 is in pneumatic communication with the filter on the side remote from the orifice and serves to draw air through the pathway 4 including the orifice 201, and filter 206 in the direction indicated by the arrow. A flow controller (not shown) is associated with the suction source for maintaining suitable flow conditions.

Figure 5:
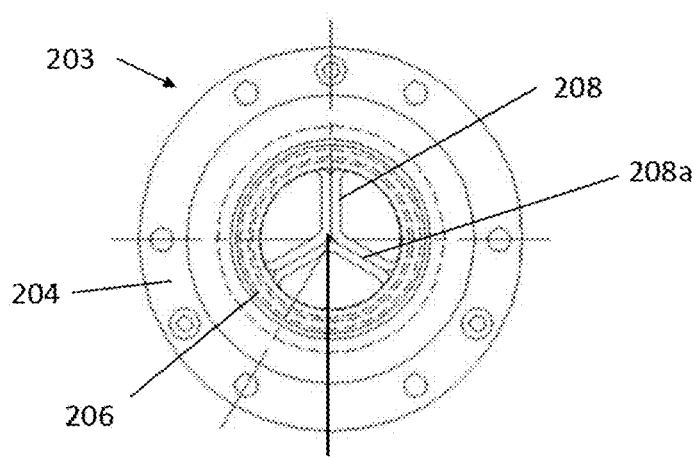
FIG. 5 is a plan view of a filter and filter support of the dose collection device of FIG. 4.

The filter 206 is supported by a filter support 207 which is configured to have minimal contact with the filter. A suitable filter device is shown in FIG. 5, in which a circular central portion of the filter 206 is cut away for ease of illustration of the filter support 207. As shown in FIG. 5, one form of suitable filter support may have three ribs 208 extending radially outwardly from a central point. The radial ribs may be of essentially triangular cross-sectional configuration such that at their upper extremity, they provide a narrow line of contact 208a with the filter, whilst for strength reasons the bottom portion of the ribs may be thicker.

Figure 6:
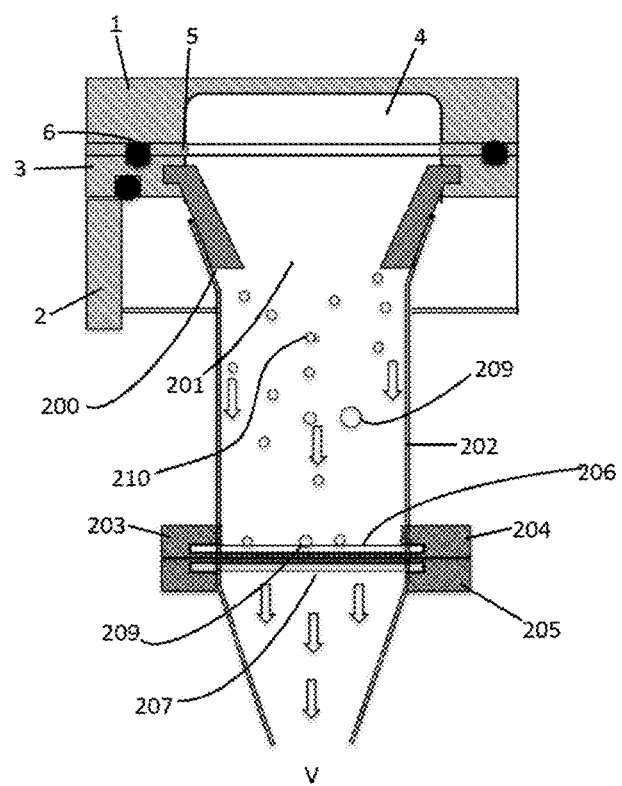
FIG. 6 shows the dose collection device of FIG. 4 during use to collect the fine particle dose of a dry powder formulation.

FIG. 6 shows the collector device of FIG. 5 in use. As shown, particles 209 which have a variety of particle sizes within the respirable range and which may in some cases be agglomerated particles 210 are delivered through orifice 201 in substantially laminar flow and the current is drawn vertically downwards onto filter 206. The air current 211 is drawn through the filter whilst the entrained particles are retained on the filter 206. Because the underside of the filter 206 has only a narrow area of contact with the support, the support 207 has little or no effect on the pattern of deposition on the filter.

Figure 7A:
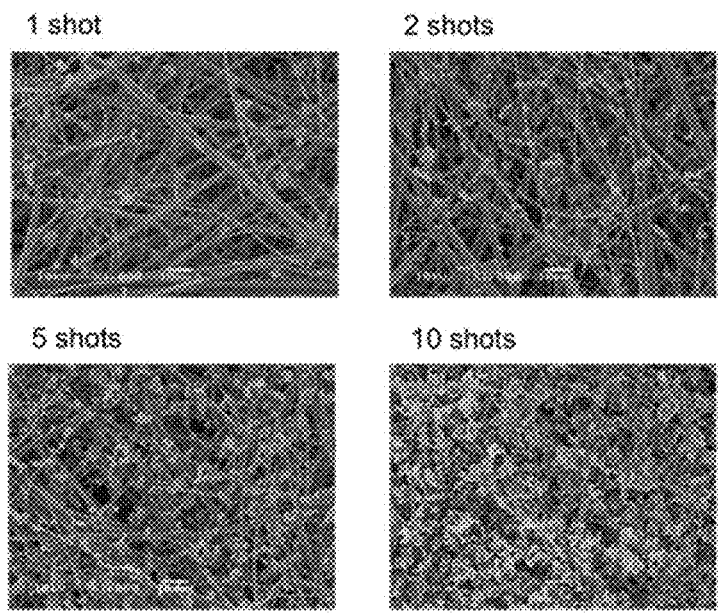
FIG. 7A shows two Scanning Electron Micrograph images at magnification ×1000 of a portion of a collection filter used in the apparatus according to the invention, after collection of an inhalable dose from a dry powder inhaler.

FIG. 7A shows images of material collected on a filter in an apparatus according to the invention from a dry powder inhaler (fluticasone propionate 250 μg Accuhaler DPI) after 1, 2, 5 and 10 actuations at a magnification of ×1000.

Figure 7B:
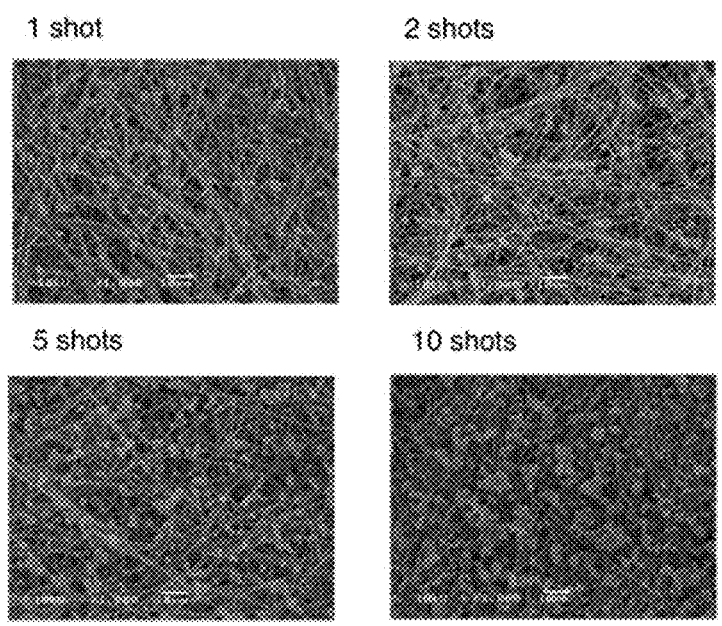
FIG. 7B shows two Scanning Electron Micrograph images at magnification ×1000, of a portion of a collection filter used in the apparatus according to the invention, after collection of an inhalable dose from a pressurised metered dose inhaler.

FIG. 7B shows images of material collected on a filter in an apparatus according to the invention from a pressurised metered dose inhaler (fluticasone propionate 125 μg Evohaler MDI) containing a suspension after 1, 2, 5 and 10 actuations at a magnification of ×1000.

Collection of the samples of FIGS. 7A and 7B was accomplished in an apparatus according to FIG. 4 in which a glass microfibre filter (Pall Corporation, A/E filter) having a nominal filter pore size of 1 μm was used. The reference scale on each image of FIGS. 7A and 7B corresponds to 10 μm.

Figure 8A:
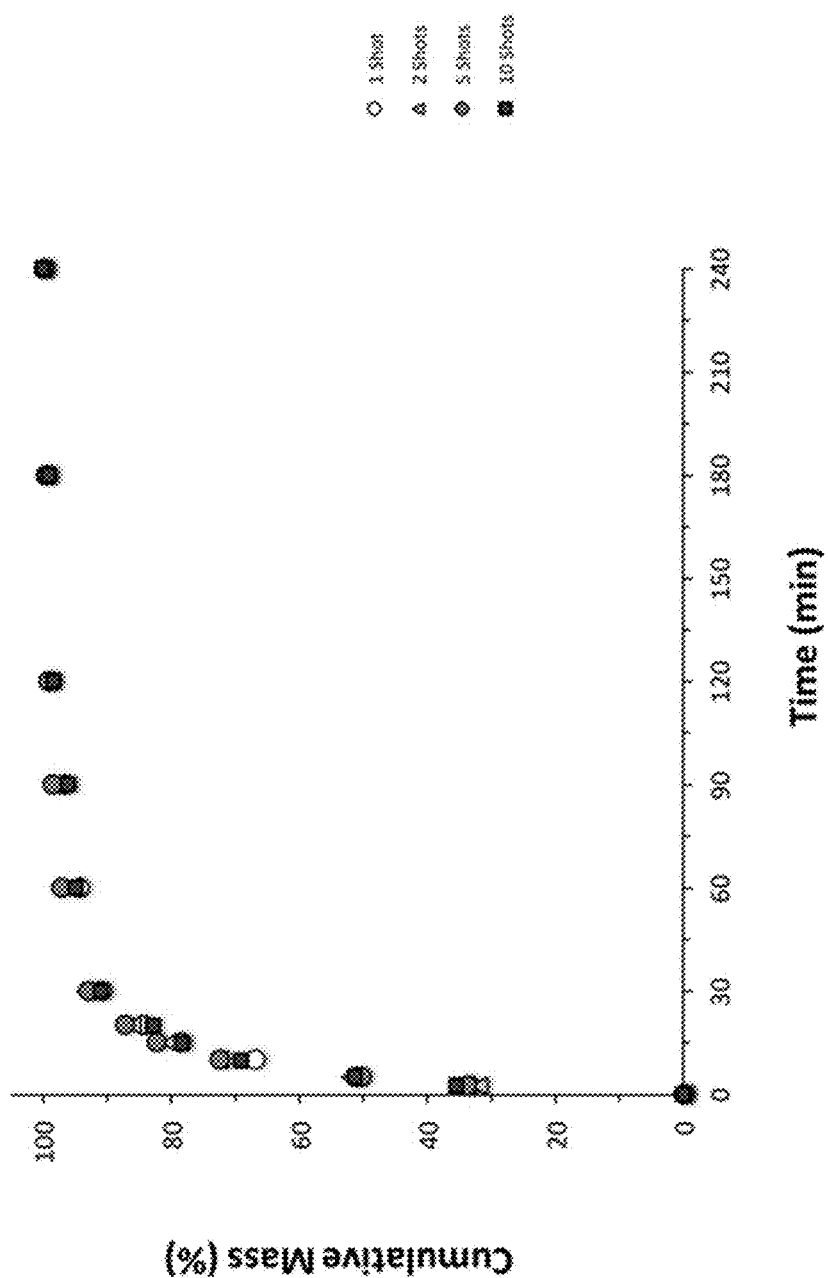
FIG. 8A is a graph showing the cumulative collected dose, as determined by dissolution test, on the filter shown on the left in FIG. 7A.
Figure 8B:
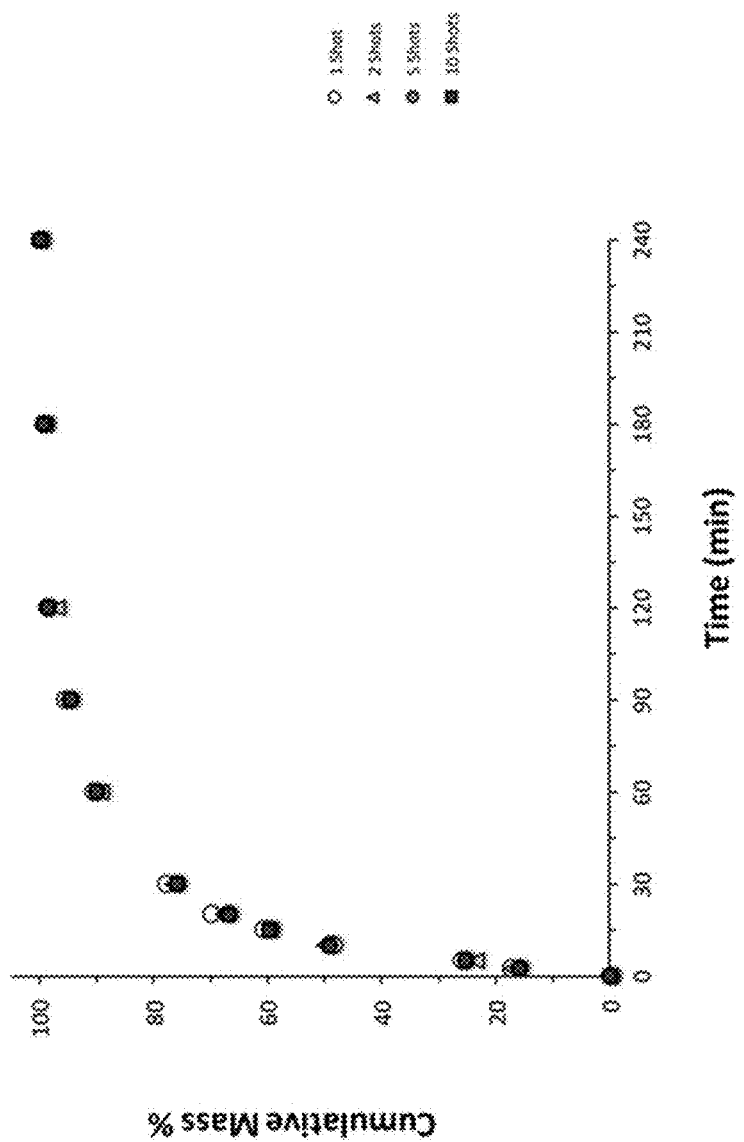
FIG. 8B is a graph showing the cumulative collected dose, as determined by dissolution test, on the filter shown on the left in FIG. 7B.

The uniformity of deposition on the filters in FIGS. 7A and 7B is reflected in the graphs in FIGS. 8A and 8B, which are dissolution graphs showing the rate of dissolution in a dissolution test for filters after 1, 2, 5 and 10 actuations.

The dissolution graph in FIG. 8A corresponds to the filter collection results shown in FIG. 7A whilst the dissolution graph in FIG. 8B corresponds to the filter collection results shown in FIG. 7B. By comparison with the actuation-dependence shown in FIG. 1 where a conventional multi-nozzle device was used, the dissolution time is shown in FIGS. 8A and 8B to be effectively independent of the number of actuations, thus offering the possibility of greatly improved correlation with in vivo lung deposition. These data indicate that the dissolution release profiles of fluticasone propionate were independent of drug loading (50-500 μg) with a surface coverage between 3.89 and 38.92 μg/cm$^2$. These findings were supported by similarity factor (f2) analysis of the dissolution profiles which were between 84-85 and 83-86 for the DPI (FIG. 8A) and MDI (FIG. 8B) dissolution profiles, respectively.

Suitable filters for use in the apparatus of the invention are generally those having a nominal pore size in the range of 1 to 3 μm. Since, in the apparatus of the invention, the filter is provided in-line in the flow pathway, suitable filters are preferably selected to have a pore size that is sufficiently small that the filter traps essentially all, and preferable not less than 90%, especially not less than 95% by weight of solids entrained in the air flow, whilst the resistance to air flow presented by the filter is relatively small. The following method may be used to evaluate filter suitability.

A HPC5 vacuum pump (Copley Scientific) was used in conjunction with a TPK controller (Copley Scientific). A DFM 2000 digital flow meter was connected to a USP throat of an apparatus according to FIG. 4 without the filter present and the flow rate adjusted to 60 L/min. A range of different filters were then inserted in series and tested. The drop in flow rate was measured with respect to flow rate with no filter present.

A change in the flow rate recorded would be associated with a change in pressure drop and resistance created by the insertion of a filter in the air path between the inlet throat and the vacuum pump. This can be expressed by the following equation:

$$Q = \frac{\sqrt{\Delta P}}{R}$$

where Q is the flow rate, P is the pressure drop and R is the resistance created by the filter properties.

As shown in Table 1, the insertion of a filter creates a drop in flow rate associated with an increase in the resistance to the air flow within the apparatus, and a decrease in pore size is associated with a significant drop in flow rate. A significant drop in flow rate will undesirably modify the air flow behaviour within the apparatus due to the restrictive properties of the filter and will also lead to problems with trying to attain higher flow rates. The data in Table 1 demonstrates that the filters with pore size in the range of 1-3 µm tested have a limited influence on the restrictive flow through the apparatus, whereas at pore sizes of less than 1 µm more the effect on flow appears to become more significant. Studies have shown that filters with a pore size of 3 µm is sufficiently fine for capturing aerosols. Whilst a pore size of at least 1 µm is preferred, in practice it is the air-permeability of the filter that influences its suitability in the apparatus of the invention, and filters with pore size of less than 1 µm may be used where they do not substantially increase the resistance to flow, for example, result in a flow rate reduction of not more than 15%, preferably not more than 10% relative to absence of a filter.

TABLE 1

| Flow rate of filters | | | |
|---|---|---|---|
| Filter | Pore size (µm) | Q (LPM) | ΔQ (LPM) |
| Blank | Not applicable | 60.2 | |
| A/E Glass microfiber (Pall Corp) | 1 | 56.2 | 4 |
| GF/F glass microfiber | 0.7 | 44.3 | 16 |
| Stainless steel 1 µm | 1 | 54.7 | 6 |
| Stainless steel 3 µm | 3 | 59.8 | 0.4 |
| Nylon | 0.45 | 21.4 | 39 |
| Nylon | 0.2 | 11.5 | 49 |

Example

A collection apparatus comprising a modified Next Generation Impactor (NGI) incorporating a collection device as shown in FIG. 1 was used to collect respirable material as described below.

The air velocity in the collection device was significantly reduced as compared with the air exit velocity in the conventional jets from an impactor nozzle, whilst laminar flow behaviour (Reynolds number: 500<Re<3000) is maintained across the calibrated flow rates of the NGI (30-100 L/min). The difference in the air velocity exiting orifice 201 (corresponding to impactor stage 2) was calculated to be an order of magnitude less as a result of the use of a single, circular orifice (from 891 cm/s to 83.7 cm/s at 60 L/min). The combination of low air flow velocity and the distribution of the whole pneumatic air across a large diameter orifice is adapted to enable uniform deposition of the aerosol dose.

The dose collection device housed a removable holder for an appropriate 47 mm diameter filter that was arranged orthogonally to the direction of the pneumatic flow. The dose collector was connected directly to a vacuum pump via a TPK controller (Critical Flow Controller Model TPK Copley Scientific, Nottingham UK). The arrangement enabled the collection of all the dose corresponding to any remaining NGI stages of a conventional impactor and allowed a direct unimpeded pathway extending from the orifice to the filter. To validate the collection efficiency of the dose collection system, the impactor stage mass (which effectively corresponds to the particulate material collected from stage 2 to the finest particle collection stage of a standard NGI) of fluticasone propionate as collected in this device was compared with a standard in vitro NGI test with increasing number of actuations (1, 2, 5 and 10 shots) of a commercial fluticasone propionate DPI (250 µg Flixotide Accuhaler).

In each run, after the relevant number of doses had been delivered into the device, the filter was removed and the collected mass dissolved in phosphate buffered saline (PBS) solution using the paddle dissolution method (USP 711, 2011) and chemically analysed by HPLC to determine the mass collected.

Measurements of collected dose were made separately with the corresponding numbers of delivered doses using the standard NGI. The impactor stage mass (ISM) was collected, corresponding to the cumulative mass collected below stage 2 of the NGI, stage 1 serving to remove larger particles leaving the respirable fraction to be collected as the ISM in subsequent stages. The ISM as collected on the stages of the standard impactor is dissolved in PBS solution and chemically analysed by HPLC to determine the mass.

Figure 9:
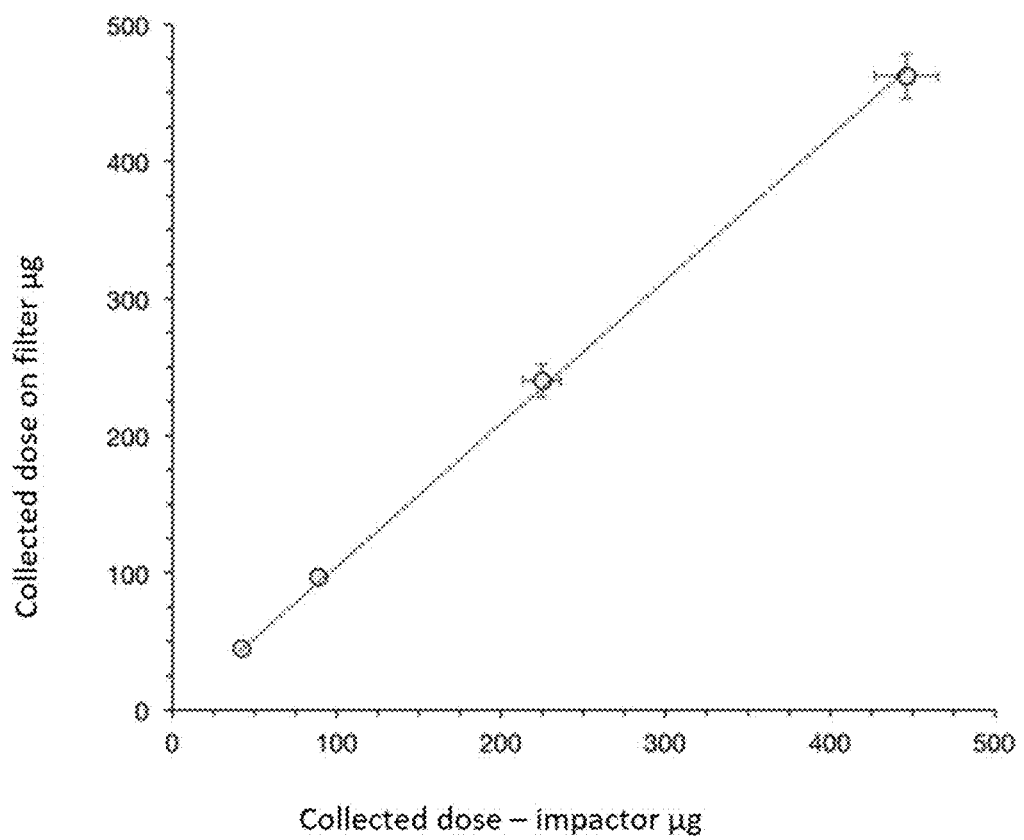
FIG. 9 is a graph showing a plot of the collected dose of drug in an apparatus of the invention against the respirable dose as collected in a standard impactor device.

As shown in FIG. 9, there is excellent correlation over a range of mass loadings between the dose collected in the apparatus of the invention and the impactor stage mass collected in the standard NGI. The cumulative increase in collected mass is directly related to 1, 2, 5 and 10 shots of the same inhaler device. This demonstrates that the apparatus of the invention provides an effective and simple means for determining aerosol dose, and independently of the number of delivered doses. The local deposition density of the fluticasone propionate particles increased with increasing drug loading with minimal aggregation and minimal in-situ agglomeration formation.

As already mentioned above, FIG. 7A shows even deposition of fluticasone propionate from a DPI (250 µg Flixotide Accuhaler), whilst FIG. 7B shows the even deposition of fluticasone propionate from a metered dose inhaler (125 µg Flixotide Evohaler). The even deposition in these images was repeatedly seen all over the cellulose based filter surface, which suggested that the representative aerosol dose was being uniformly deposition over the large surface area (filter area=17.4 cm$^2$) of the filter.

To determine the collected dose in the paddle dissolution method these drug coated filters were carefully loaded and secured onto a stainless steel disk assembly (NW-50-CR-SV-74, NorCal Inc., USA). The disk assembly was an adaption of a transdermal patch holder utilised for the paddle-over-disk dissolution apparatus. The disk assembly ensures that the dead volume between the bottom of the vessel and the filter is minimised and the filter is held in a position such that the collected dose is parallel with the bottom of the paddle blade. The dissolution release profiles corresponding to the filters of FIGS. 7A and 7B, plotted as a cumulative mass (%), of the ISM dose of fluticasone propionate with increasing number of actuations (1, 2, 5 and 10 actuations) from a commercial 250 µg Flixotide Accuhaler DPI and a 125 µg Flixotide Evohaler MDI are shown in FIGS. 8A and 8B respectively.

Figure 10:
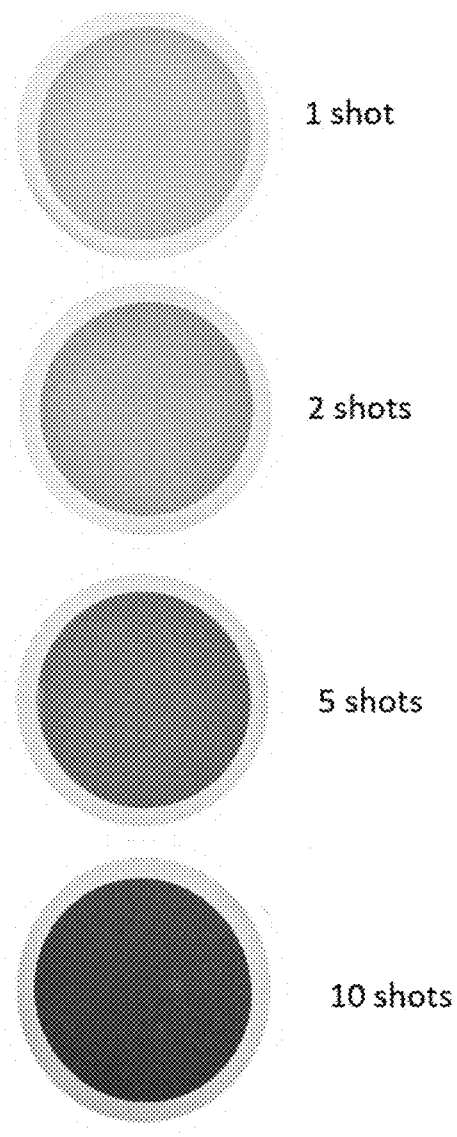
FIG. 10 shows the relative loading of filters with increasing material loading as visualised using an alcohol ink solution based pMDI aerosolised formulation.

The influence of the aerosol dose collection design on uniformity of deposition across a filter surface was visualised by formulating an alcohol ink (Raisin (TIM22145), Jim Holtz® Adirondack Alcohol inks, USA) as a solution based MDI. As shown in FIG. 10, the uniformity and increasing intensity of the ink with increasing number of actuations suggested that an aerosol dose may deposit uniformly across the filter surface.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An apparatus for collecting aerosolised respirable particles of an inhalable medicinal formulation, comprising:
   an inlet for receiving an aerosolised dose of the medicinal formulation;
   a suction source for generating a pneumatic flow through the apparatus;
   a channel defining a pathway extending from said inlet to said suction source;
   a dose collection section located in said pathway and comprising an inlet orifice, a filter unit comprising an air-permeable filter, and a filter support, the filter being positioned opposed to said inlet orifice, and extending across the pathway for filtering the pneumatic flow so as to retain particulate material therein on said filter, and the inlet orifice being so dimensioned and configured that it has an unimpeded area that is no less than 75% of the area of said filter on which the dose will be collected;
   wherein said suction source communicates with said pathway downstream of said filter unit, wherein the apparatus is configured such that the pneumatic flow delivered through the inlet orifice has a Reynolds number of between 500 and 3000, and wherein the filter support comprises one or more support members extending across the pathway on the surface of the filter opposed to the inlet orifice for supporting a central region of the filter, the filter support defining from two to six apertures and at least 50% of the underside of the filter remains completely unobstructed.

2. The apparatus according to claim 1, further comprising a removal device located in said pathway upstream of the dose collection device, for removal of particles of non-respirable particle size from the pathway.

3. The apparatus according to claim 2, wherein there is provided in said pathway between said removal device and said dose collection unit one or more inertial separation units for elimination of one or more further particle size fractions from the pneumatic flow before it reaches said dose collection unit.

4. The apparatus according to claim 1, wherein the filter is selected from woven fabrics, nonwoven fabrics, meshes and air-permeable films.

5. The apparatus according to claim 1, wherein the filter has a pore size of not more than 5 µm.

6. The apparatus according to claim 1, wherein the filter has an air permeability which is such that the filter generates a reduction in flow rate of not more than 20% relative to absence of a filter.

7. The apparatus according to claim 1, wherein the filter has a pore size of at least 1 µm.

8. The apparatus according to claim 1, wherein the orifice is arranged substantially perpendicular to the filter.

9. The apparatus according to claim 1, wherein the arrangement is such that at least 95% by mass of particles having an aerodynamic diameter of 10 µm or less will reach the filter unit.

10. The apparatus according to claim 1, further comprising upstream of said orifice an inertial separation device having a delivery nozzle that is of cross-sectional area smaller than the cross-sectional area of said orifice.

11. The apparatus according to claim 10, wherein said upstream inertial separation device is in communication with the orifice via said pathway.

12. The apparatus of claim 1, wherein a portion of said pathway extending from the orifice to the filter is straight and is uninterrupted by any structures that would materially interfere with the uniformity of the flow.

13. A method for collecting an aerosolised respirable fraction of an inhalable medicinal formulation including respirable and non-respirable particle size fractions, comprising:
   generating an aerosolised dose of the medicinal formulation containing respirable and non-respirable particles;
   removing particles of a non-respirable size from said aerosolised dose by inertial separation;
   delivering a pneumatic flow carrying respirable particles along an unimpeded pathway to a filter, wherein the pneumatic flow has a Reynolds number of between 500 and 3000 and a pneumatic flow rate of from 10 to 100 litres per minute; and
   effecting filtration of the pneumatic flow at said filter such that the respirable particles are retained on the filter.

14. The method of claim 13, wherein the pathway comprises an inlet orifice opposed to the filter and through which the pneumatic flow is delivered to the filter, and the inlet orifice having a diameter of not less than 14 mm.

15. The method of claim 14, wherein a distance between the inlet orifice and the filter is up to 10 cm.

16. The method of claim 14, wherein the inlet orifice includes a tapered member, and at the outlet, the inlet orifice having a diameter at least 10 mm in diameter.

17. The method of claim 13, wherein the filter has a diameter of at least 10 mm.

18. The method of claim 13, wherein the filter has a diameter of at least 20 mm.

19. The method of claim 13, said method further comprising the step of subjecting the filter carrying said collected particles to a dissolution test to determine the dissolution characteristics of the inhalable medicinal formulation.

20. The method of claim 13, wherein the filter is supported by a filter support, the filter support comprising one or more support members extending across the pathway on the surface of the filter for supporting a central region of the filter, the filter support defining from two to six apertures and at least 50% of the underside of the filter remains completely unobstructed.

21. An apparatus for collecting aerosolised respirable particles of an inhalable medicinal formulation, said apparatus comprising:
   an inlet for receiving an aerosolised dose of the medicinal formulation;
   a suction source for generating a pneumatic flow through the apparatus;
   a channel defining a pathway extending from said inlet to said suction source;
   a dose collection section located in said pathway and comprising an inlet orifice, an air-permeable filter, and a filter support, the filter being positioned opposed to said inlet orifice, and extending across the pathway for filtering the pneumatic flow so as to retain particulate material therein on said filter;

wherein said suction source communicates with said pathway downstream of said filter unit;

wherein the apparatus is configured such that the pneumatic flow delivered through the inlet orifice has a Reynolds number of between 500 and 3000 and wherein the filter support comprises one or more support members extending across the pathway on the surface of the filter opposed to the inlet orifice for supporting a central region of the filter, the filter support defining from two to six apertures and at least 50% of the underside of the filter remains completely unobstructed.

22. The apparatus of claim 21, wherein a portion of said pathway extending from the orifice to the filter is straight and is uninterrupted by any structures that would materially interfere with the uniformity of the flow.

23. The apparatus of claim 21, wherein the inlet orifice has a diameter of not less than 14 mm.

24. The apparatus of claim 21, wherein the inlet orifice has a diameter, and a distance between the inlet orifice and the filter is not more than three times the diameter of the inlet orifice.

25. The apparatus of claim 21, wherein a distance between the inlet orifice and air-permeable filter is up to 10 cm.

26. The apparatus of claim 21, wherein the inlet orifice includes a tapered member, and at the outlet, the inlet orifice having a diameter at least 10 mm in diameter.

27. The apparatus of claim 21, wherein the air-permeable filter has a diameter of at least 10 mm.

28. The apparatus of claim 21, wherein air-permeable filter has a diameter of at least 20 mm.

* * * * *

UNITED STATES PATENT AND TRADEMARK OFFICE
CERTIFICATE OF CORRECTION

| | | |
|---|---|---|
| PATENT NO. | : 11,181,447 B2 | Page 1 of 1 |
| APPLICATION NO. | : 16/903405 | |
| DATED | : November 23, 2021 | |
| INVENTOR(S) | : Price et al. | |

It is certified that error appears in the above-identified patent and that said Letters Patent is hereby corrected as shown below:

On the Title Page

Item (30) Please add:
-- (30) Foreign Application Priority Data
Sep. 22, 2015 (GB) .............................. 1516802.4 --

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*